(12) United States Patent
Dusik et al.

(10) Patent No.: US 9,740,935 B2
(45) Date of Patent: Aug. 22, 2017

(54) MAINTENANCE ASSISTANT SYSTEM

(71) Applicant: HONEYWELL INTERNATIONAL INC., Morristown, NJ (US)

(72) Inventors: Matej Dusik, Brno (CZ); Dinkar Mylaraswamy, Fridley, MN (US); Jiri Vasek, Brno (CZ); Jindrich Finda, Brno (CZ); Michal Kosik, Dolny Kubin (SL)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 265 days.

(21) Appl. No.: 14/090,095

(22) Filed: Nov. 26, 2013

(65) Prior Publication Data
US 2015/0146007 A1 May 28, 2015

(51) Int. Cl.
*G06K 9/00* (2006.01)
*G06K 9/62* (2006.01)
*G06T 19/00* (2011.01)
*G02B 27/01* (2006.01)

(52) U.S. Cl.
CPC ....... *G06K 9/00671* (2013.01); *G06K 9/6202* (2013.01); *G06T 19/006* (2013.01); *G02B 2027/0141* (2013.01)

(58) Field of Classification Search
CPC .. G02B 27/017; G06T 19/006; G06K 9/6202; G06K 9/00671; G06K 9/74; G06K 811/022; G01B 11/022; G07C 9/00158; G08B 13/19602; G08B 13/19652; G08B 13/19621; G08B 25/14; G08B 25/016; G08B 21/02; H04N 7/185; G05B 19/409;
(Continued)

(56) References Cited

U.S. PATENT DOCUMENTS

| 8,760,471 B2 * | 6/2014 | Ihara | G06F 11/0727 345/632 |
| 2002/0049566 A1 * | 4/2002 | Friedrich | G05B 19/409 702/188 |
| 2002/0049775 A1 | 4/2002 | Friedrich et al. | |

(Continued)

FOREIGN PATENT DOCUMENTS

| WO | 2007066166 A1 | 6/2007 | |
| WO | WO 2009067170 A1 * | 5/2009 | G06T 7/208 |

OTHER PUBLICATIONS

Extended European Search Report for 14190559.6-1958 dated Apr. 23, 2015.

(Continued)

*Primary Examiner* — Mohammed Jebari
(74) *Attorney, Agent, or Firm* — Lorenz & Kopf, LLP

(57) ABSTRACT

A maintenance assistance system and method of operating are provided. The maintenance assistance system may include, but is not limited to, a camera, a heads-up display, a memory configured to maintenance task data, and a processor communicatively coupled to the camera, the heads-up display and the memory, the processor configured to determine a component to be serviced, determine a location of the component based upon data from the camera and the maintenance task data stored in the memory, generate graphical data based upon a maintenance step associated with the component, and output the generated graphical data to the heads-up display

8 Claims, 3 Drawing Sheets

(58) Field of Classification Search
CPC ...... G05B 23/0216; G05B 2219/35487; G05B 2219/32014
See application file for complete search history.

(56) References Cited

U.S. PATENT DOCUMENTS

| | | | |
|---|---|---|---|
| 2002/0089544 A1* | 7/2002 | Jahn | G06F 3/011 715/778 |
| 2002/0099810 A1* | 7/2002 | Kiesel | H04L 12/66 709/223 |
| 2002/0191002 A1* | 12/2002 | Friedrich | G05B 19/409 345/632 |
| 2009/0187389 A1* | 7/2009 | Dobbins | G06F 3/011 703/6 |
| 2012/0116728 A1* | 5/2012 | Shear | G06F 17/50 703/1 |
| 2012/0120070 A1 | 5/2012 | Baillot | |
| 2012/0170804 A1* | 7/2012 | Lin | G06T 7/204 382/103 |
| 2012/0183137 A1 | 7/2012 | Laughlin | |
| 2013/0083063 A1* | 4/2013 | Geisner | G06T 19/006 345/633 |
| 2013/0088414 A1 | 4/2013 | Artsyukhovich et al. | |
| 2013/0265425 A1 | 10/2013 | Smailus et al. | |
| 2013/0335611 A1* | 12/2013 | Roman | G06F 17/30247 348/333.01 |
| 2014/0361988 A1* | 12/2014 | Katz | G06F 3/011 345/156 |
| 2015/0110385 A1* | 4/2015 | Schmidt | G06T 7/0044 382/154 |

OTHER PUBLICATIONS

Caudell, T. P. et al.: "Augmented Reality: An Application of Heads-Up Display Technology to Manual Manufacturing Processes" IEEE 0073-1129-1192; 1992.

Henderson, S. J. et al.: "Augmented Reality for Maintenance and Repair (ARMAR)" AFRL-RH-WP-TR-2007-0112; final report, Aug. 2007.

"BMW Augmented Reality in practice" URL: http://www.bmw.com/com/en/owners/service/augmented_reality_workshop_1.html, retrieved from the Internet on Jul. 31, 2013.

EP Exam Report for Application No. 14190559.6-1958 dated Sep. 16, 2016.

* cited by examiner

MAINTENANCE ASSISTANT SYSTEM

TECHNICAL FIELD

The present disclosure generally relates to maintenance systems, and more particularly relates to a system and method for training a technician and assisting the technician in performing maintenance.

BACKGROUND

Maintenance personnel often need both hands to perform maintenance tasks. However, in complex systems maintenance personnel will often have to consult detailed drawings to identify and locate components and consult manuals to confirm the proper steps to perform the needed maintenance, increasing the difficulty in performing the maintenance task. Accordingly, systems and methods for assisting maintenance personnel in performing their duties are desirable.

BRIEF SUMMARY

In one embodiment, for example, a maintenance assistance system is provided. The maintenance assistance system may include, but is not limited to, a camera, a heads-up display, a memory configured to store maintenance task data, and a processor communicatively coupled to the camera, the heads-up display and the memory, the processor configured to determine a component to be serviced, determine a location of the component based upon data from the camera and the maintenance task data stored in the memory, generate graphical data based upon a maintenance step associated with the component, and output the generated graphical data to the heads-up display.

In another embodiment, a method for operating a maintenance assistance system comprising a camera, a heads-up display, a memory and a processor communicatively coupled to the camera, the heads-up display and the memory. The method may include, but is not limited to receiving, by the processor, an indication of a component, determining, by the processor, a location of the component based upon data from the camera and maintenance task data stored in the memory, generating, by the processor, graphical data based upon a maintenance step associated with the component, and outputting, by the processor, the generated graphical data to the heads-up display.

In yet another embodiment, a computer-readable medium is provided. The computer-readable medium, which when executed by a processor, operate a maintenance assistance system comprising the processor, a camera, a heads-up display, and a memory, the instructions causing the processor to determine a component to be serviced, determine a location of the component based upon data from the camera and the maintenance task data stored in the memory, generate graphical data based upon a maintenance step associated with the component, and output the generated graphical data to the heads-up display.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a maintenance assistance system is provided. The maintenance assistance system utilizes a heads-up display to assist a maintenance technician in performing maintenance tasks. The maintenance assistance system utilizes image processing to locate a component involved in a maintenance task by comparing an image of the component taken by a camera with either stored images of the component or a three-dimensional model of the component. The maintenance assistance then overlays images on the heads-up display to assist the maintenance technician in locating the component and instructions for servicing the component, as discussed in further detail below.

Figure 1:
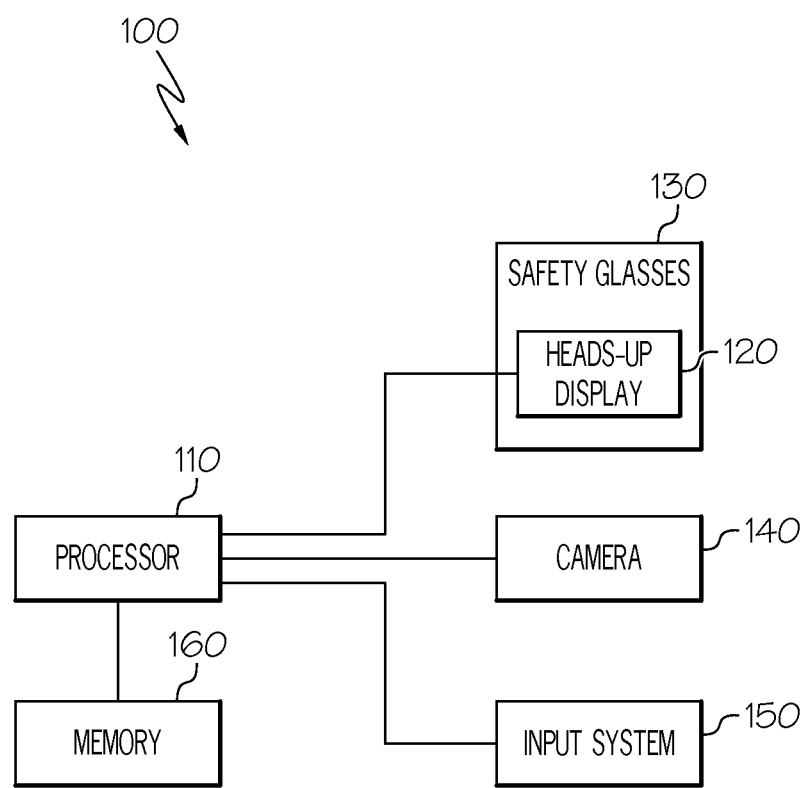
FIG. 1 is a block diagram of a maintenance assistance system, in accordance with an embodiment.

FIG. 1 is a block diagram of a maintenance assistance system 100, in accordance with an embodiment. The maintenance assistance system 100 includes a processor 110. The processor 110 may be a central processing unit (CPU), graphical processing unit (GPU), a physics processing unit (PPU), an application specific integrated circuit (ASIC), a microprocessor, an field programmable logic array, or any other logic circuit or combination thereof In one embodiment, for example, the processor 110 may be housed in a heads-up display 120. In another embodiment, for example, the processor 110 may be housed technician mountable system, such as in a belt or bag which the technician could wear. In this embodiment, for example, the processor may be coupled to the other components of the maintenance assistance system 100 via a wire, a wireless system, or any combination thereof The wireless system, for example, may be a Bluetooth system, a Zigbee system, a cellular system, a WiFi system, or any other type of communication system, or combination thereof In another embodiment, for example, the processor 110 may be located remotely from the technician. In this embodiment, for example, the processor 110 may be in a server or other general purpose computer and may communicate with the other components of the maintenance assistance system 100 via one or more of the wireless systems. There are several ways the camera may be attached to technician, for example, on the left or right side of the technicians head (or on both sides, if 2 or more cameras are used), above the head, right above/below the glasses, or on their shoulder.

The heads-up display (HUD) 120 may be any transparent display that presents data without requiring users to look away from their usual viewpoints. In one embodiment, for example, the HUD 120 may be incorporated into safety glasses 130 that a maintenance technician can wear. In another embodiment, for example, the HUD 120 may be incorporated into a contact lens having an integrated display. The HUD 120 may include two components: a projector unit and a combiner. The projection unit may include an optical collimator setup having a convex lens or concave mirror with a Cathode Ray Tube, light emitting diode, or liquid crystal display at its focus. The combiner is typically an angled flat piece of glass (otherwise known as a beam splitter) located directly in front of the viewer, that redirects the projected image from the projection unit in such a way as to see a field of view around the maintenance technician and the projected image at the same time. Combiners may have special coatings that reflect the monochromatic light projected onto it from the projector unit while allowing all other wavelengths of light to pass through. In some optical layouts combiners may also have a curved surface to refocus the image from the projector. The processor 110 provides the interface between the HUD (i.e. the projection unit) and the systems/data to be displayed and generates the imagery and symbology to be displayed by the projection unit, as discussed in further detail below. In one embodiment, for example, the HUD 120 may also include three gyroscopes and three accelerometers (or any other device able to measure all "six degrees of freedom" of technician's head—movements forward/backward, up/down, left/right and rotation—pitch, yaw, and roll) which can help determine which direction and angle the technician moved their head and therefore it can improve detection. For example, if the processor 110 has previously detected the component and the technician moved their head left, the processor 110 will receive information about this movement and be able to determine that because the head was moved left the component is located right from its previous known location. Accordingly, the processor would not need to look for the component in the whole scene from the camera, but rather only a part of the scene.

The maintenance assistance system 100 further includes a camera 140. In one embodiment, for example, the camera 140 may incorporated into or mounted on safety glasses 130. The camera 140 may be any device able to provide information necessary to recognize if a component is located in the scene and where the component is within the scene. This information can be obtained from a color image, grayscale image (by using an "ordinary camera"), thermal image (IR/thermal camera), near infrared image (NIR camera), from depth map (calculated from one camera (either so-called "structure from motion algorithms or a combination of lidar and NIR) or 2 or more cameras (where these cameras may be any combination of cameras mentioned above), and other possible outputs such as output from radar, laser scanner). As discussed in further detail below, the processor analyzes data from the camera 140 to detect objects in the environment to aid the technician in a maintenance task and can be used to record a maintenance task for quality assurance purposes.

The maintenance assistance system 100 further includes an input system 150. In one embodiment, for example, the input system 150 may be a microphone. In this embodiment, a technician may interact with the maintenance assistance system 100 by speaking into the microphone. The processor 110 would then analyze the speech and output a response to aid the technician in a maintenance task, as discussed in further detail below. In this embodiment, for example, the input system 150 may incorporated into or mounted on the safety glasses 130. In other embodiments, for example, the input system 150 may be a keyboard. The keyboard may be a physical keyboard or a virtual keyboard. An image of a keyboard, for example, may be overlaid onto any surface by the HUD 120. The processor 110 may then analyze data from the camera 140 to determine if the maintenance technician is pressing any of the keys on the virtual keyboard. The virtual keyboard may be a standard QWERTY style keyboard or may be a customize keyboard appropriate for the maintenance task. In another embodiment, for example, hand gestures may be captured by the camera and processed into commands by the processor 110. In yet other embodiments, for example, a touch display may be provided as the input system 150. Any combination of input systems may be used.

The maintenance assistance system 100 further includes a memory 160. The memory 160 may be any non-transitory computer-readable memory. In one embodiment, for example, the memory may be housed in a technician mountable system, such as in a belt or bag which the technician could wear. In another embodiment, for example, the memory 160 may be located remote from the technician. In this embodiment, for example, the processor 110 may be communicatively coupled to the memory 160 via a wireless communication system, as discussed above. The memory 160 may store non-transitory computer-readable instructions for operating the maintenance assistance system 100, as discussed in further detail below.

The memory 160 may also store maintenance task data. The maintenance task data may include data defining the steps in a maintenance task. The maintenance task data may also include multiple images or 3-D models of various components involved in a maintenance task. Images or 3-D models may be stored, for example, at each stage of a maintenance task. The images or 3-D models may be stored, for example, by a technician who previously performed the maintenance task or they (images/3D models) may be created in a preparation phase (only once per aircraft). As discussed in further detail below, the processor may compare an image/model take by the camera to one or more of the stored images/models to determine if a task was completed correctly. The processor could determine that a task was completed correctly if the image/model taken by the camera matches the image/model stored in the memory. The maintenance task data may also include three-dimensional model data of components to be services. The 3-D model of a component can be obtained from any CAD system (or any other 3-D modeling system) which was used to design this component. Then, by creating a depth map of the scene (either by using of a stereo cameras, lidar, or any other device that can compute a depth map of a given scene), the obtained 3-D model of the component will be searched for in this scene's depth map. In other words the 3-D model is being matched to an appropriate object in a 3-D scene captured and generated by the camera.

Figure 2:
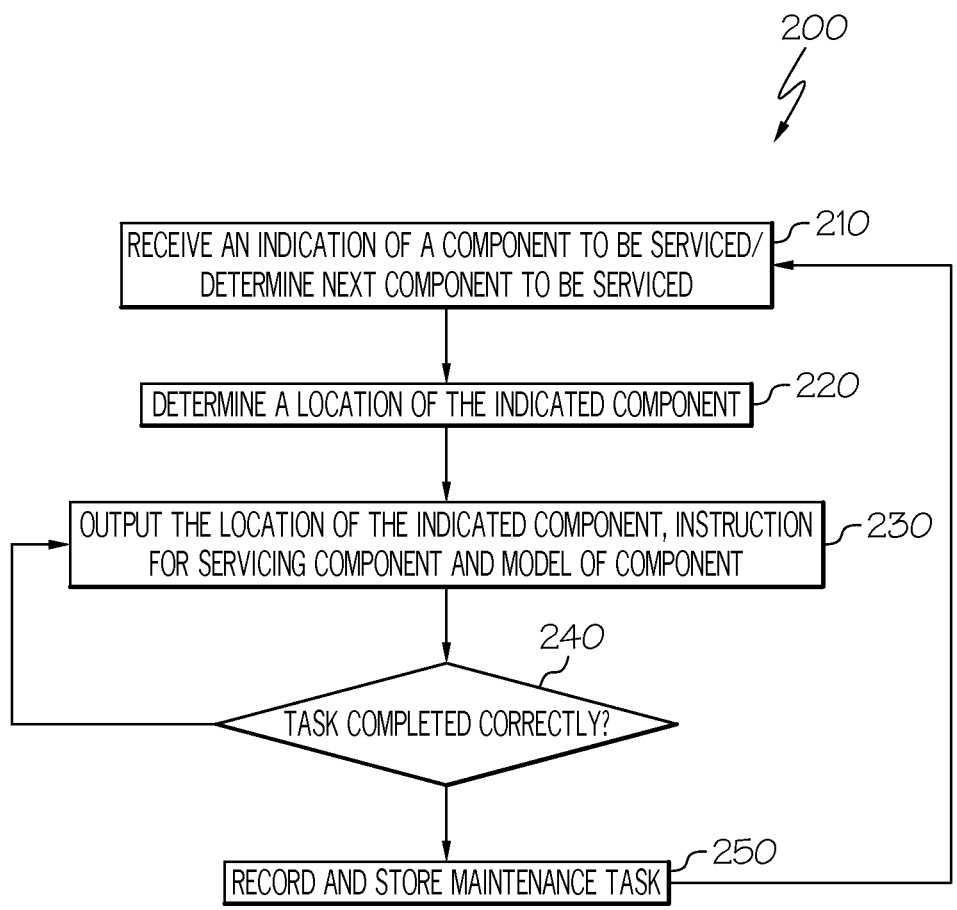
FIG. 2 is a flow diagram illustrating an exemplary method for operating a maintenance assistance system, in accordance with an embodiment.

FIG. 2 is a flow diagram illustrating an exemplary method 200 for operating a maintenance assistance system, in accordance with an embodiment. A processor, such as the processor 110 illustrated in FIG. 1, first receives an indication of a component to be serviced. (Step 210). In one embodiment, for example, a component may be any system such as an engine, a vehicle or aircraft, any industrial or commercial machine or any part thereof (screws, circuit boards, braking system, etc.). In one embodiment, for example, the technician may speak the name of the component. In this embodiment, for example, a microphone may capture the speech and transmit the captured speech data to the processor. The processor may then analyze the speech data and determine which component the technician is attempting to locate. In another embodiment, for example, the indication may be received via a virtual keyboard, a physical keyboard, from any other input system, electronically from a work order or job card, or any combination thereof The processor then determines a location of the indicated component. (Step 220). The location of the indicated component is stored in a memory, such as the memory 160 illustrated in FIG. 1. In one embodiment, for example, the location of the component may be stored relative to one or more two dimensional images generally taken from the perspective of where the technician would be. The processor may then compare an image taken by the camera to the image stored in the memory to identify the location of the component. This may be done by using marker or markerless detection to find the component in the image/video taken from camera, and optionally tracking of once detected object using tracking algorithms and estimating the rotation and translation of component in image in order to match it to the component in the scene (this is done by using of pose estimation algorithms). In another embodiment, for example, a three-dimensional model of the component may be stored in the memory. The three dimensional model may include a location of each component on the model. In this embodiment, for example, the processor may compare an image taken by the camera to the three-dimensional model to determine a location of the indicated component. This may be done by using 3-D model detection/matching algorithms to find the component in the image/video taken from camera, and optionally tracking of once detected object using tracking algorithms and estimating the rotation and translation of component in image in order to match it to the component in the scene (this may be done by using of pose estimation algorithms).

Figure 3:
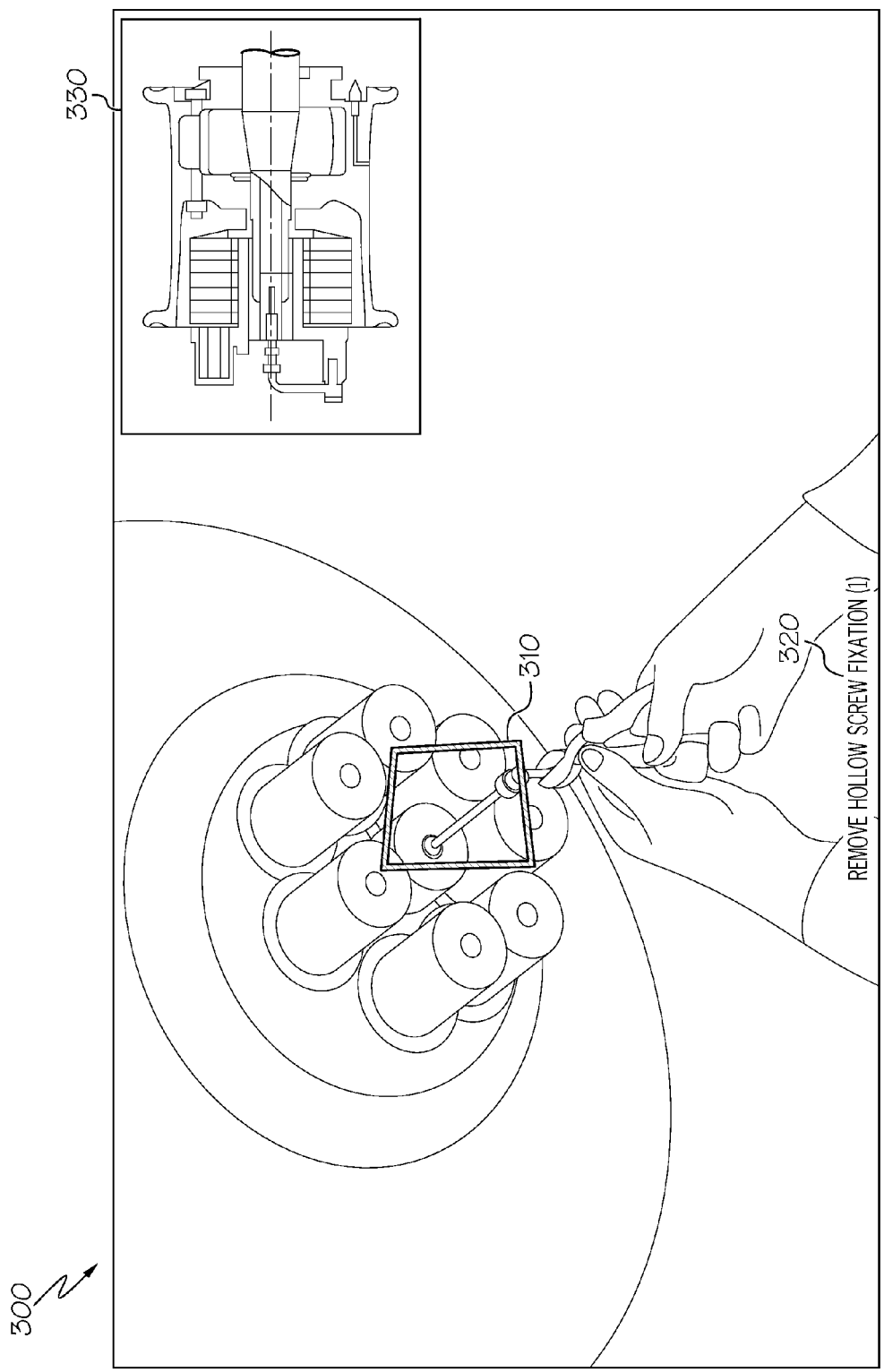
FIG. 3 is a view of a heads-up display image, in accordance with an embodiment.

The processor then generates graphical information on the location of the component, instructions for servicing the component and/or a model of the component and outputs the generated graphical information to the heads-up display. (Step 230). FIG. 3 is a view of a heads-up display image 300, in accordance with an embodiment. In this exemplary embodiment, the technician is servicing an engine in which the next step of the servicing is to remove a screw. The image includes an indication 310 of the location of the component to be serviced. In this embodiment, for example, the indication is a box surrounding the screw. However, one of ordinary skill in the art would recognize that the indication 310 may be shown in a variety of ways. In one embodiment, for example, the indication 310 may be an image or a 3-D model of the component to be service may be overlaid onto a location of the component. In another embodiment, for example, the indication 310 may be an arrow pointing to the component. There may also be various tools necessary for manipulating the component shown on the display. However, this indication can be turned off manually or it may disappear (and reappear after pressing appropriate button on control device, performing a specific hand gesture, saying a key word/phrase or any performing any similar control action) in order to ease technician focus on the maintenance procedure. The image 300 further includes an instruction 320 for servicing the component. In this embodiment, the instruction 320 is text instructing the technician to remove a screw. However, one of ordinary skill in the art would recognize that the instruction 320 may be shown in a variety of ways. In another embodiment, for example, the instruction 320 may be a video of another technician performing the instruction. The video may be played in a corner of the heads-up display image so as to not block the technicians view of the actual component while the video is being played. The instruction can also be a live video chat with other technician that will provide a professional consultation about the maintenance procedure. Also, the instruction can be an animation (using 3D models) showing what shall be done. The image may further include a model 330 of the component and/or system the component is in. The model 330 may be used, for example, by the technician as a reference. While FIG. 3 illustrates an image having an indication 310, an instruction 320 and a model 330, any combination of the indication 310, instruction 320 and model 330 may be displayed on the heads-up display. Furthermore, the technician may add or remove the indication 310, instruction 320 and model 330 from the heads-up display at any time. In one embodiment, for example, the processor may monitor data from the camera for a user gesture. The technician, for example, may use various gestures to add or remove any of the indication 310, instruction 320 and model 330. For example, if the technician swipes at the model 330, the model could be removed. Other gestures may include, but are not limited to, holding up a predetermined number of fingers, thumbs up, thumbs down, tapping the virtual image, swiping, grabbing (using fist) or any combination thereof. In one embodiment, these gestures may be performed wherever in the view of the camera and wherever in the scene, in another embodiment, these gestures will be recognized as valid only in a certain part of the scene (for example only if the gesture is performed left from the engine) what will reduce the number of unintentional hand moves that would be recognized as valid gestures.

Returning to FIG. 2, the processor then determines if the task was completed correctly. (Step 240). In one embodiment, for example, the processor may analyze data from the camera to determine if the task was completed correctly. In this embodiment, the processor may compare an image stored in memory of the component after the task is complete relative to an image taken by the camera. In another embodiment, for example, the processor may compare an image taken by the camera to an updated three-dimensional model that reflects the changes that should have been made to the component. If, for example, the processor is comparing camera data to images, the processor may instruct the technician to move their head to a certain position such that the camera data (angles, distances, etc.) match up with one or more of the stored images. When the processor is comparing the camera data to a 3-D model, the processor is able to rotate the stored model and match it directly to the real-scene, therefore no extra positioning is required. If the task was not completed correctly, the processor may provide further instructions to the technician. (Step 230). For example, if the technician removed the wrong screw, the processor could instruct the technician to re-install the screw before repeating the instructions to remove the correct screw. In another embodiment, for example, the processor may automatically play a video of another technician correctly performing the task. If the task was completed correctly, the processor may store a recording of the technician performing the task into the memory. (Step 250). The video may be used for quality assurance purposes or to provide training for other technicians in the future. The processor then returns to step 210 and determines the next step in the maintenance task, if any, either from an electronic job card storing the tasks or from user input. Alternatively, the technician may manually trigger the processor to switch between steps via, for example, voice, gestures or any other input to an input system. This may allow the technician to train on the procedure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A maintenance assistance system, comprising:
   a camera;
   a heads-up display;
   a memory configured to store maintenance task data and a plurality of three-dimensional models each associated with at least one component to be serviced; and
   a processor communicatively coupled to the camera, the heads-up display and the memory, wherein for each maintenance step of a maintenance task the processor is configured to:
   determine the component to be serviced for the current maintenance step of a maintenance task based upon the maintenance task data stored in the memory;
   determine a location of the component to be serviced for the current maintenance step of the maintenance task based upon markerless image data from the camera and the three dimensional model associated with the component to be serviced by comparing the markerless image data from the camera to the three dimensional model associated with the component to be serviced;
   generate graphical data for the current maintenance step of the maintenance task, the graphical data including a location indicator for locating the component based upon the determined location of the component;
   output the generated graphical data to the heads-up display;
   determine automatically, after the current maintenance step of the maintenance task is indicated to be completed, whether the current maintenance step was correctly completed by comparing an image from the camera to an updated three-dimensional model of the component, the updated three-dimensional model of the component updated to reflect the state of the component after the change to the component that should have been made when the maintenance step was correctly performed;
   generate, when the current maintenance step was not completed correctly, further instructions to complete the current maintenance step and output the further instructions to the heads-up display; and
   proceed to a next maintenance step when the current maintenance step was completed correctly.

2. The maintenance assistance system of claim 1, wherein the graphical data includes instructions for servicing the component.

3. The maintenance assistance system of claim 1, wherein the graphical data further includes a model of the component.

4. The maintenance assistance system of claim 1, wherein the processor is further configured to store a video of the maintenance step once the processor determines that the maintenance step was correctly completed.

5. A method for operating a maintenance assistance system comprising a camera, a heads-up display, a memory and a processor communicatively coupled to the camera, the heads-up display and the memory, the method comprising:
   receiving, by the processor, an indication of a component for a current maintenance step of a maintenance task;
   determining, by the processor, a location of the component based upon markerless image data from the camera and three dimensional model associated with the component by comparing the markerless image data from the camera to the three dimensional model associated with the component;
   generating, by the processor, graphical data for the current maintenance of the maintenance task, the graphical data including a location indicator for locating the component based upon the determined location of the component;
   outputting, by the processor, the generated graphical data to the heads-up display;
   determine automatically, after the current maintenance step of the maintenance task is indicated to be completed, whether the current maintenance step was correctly completed by comparing an image from the camera to an updated three-dimensional model of the component, the updated three-dimensional model of the component updated to reflect the state of the component after the change to the component that should have been made when the maintenance step was correctly performed;
   generate, when the current maintenance step was not completed correctly, further instructions to complete the current maintenance step and output the further instructions to the heads-up display; and
   proceed to a next maintenance step when the current maintenance step was completed correctly.

6. The method of claim 5, wherein the graphical data includes instructions for servicing the component.

7. The method of claim 5, wherein the graphical data further comprises a model of the component.

8. A non-transitory computer-readable medium storing instructions, which when executed by a processor, operate a maintenance assistance system comprising the processor, a camera, a heads-up display, and a memory, the instructions causing the processor to:
   determine a component to be serviced for a current maintenance step of a maintenance task;
   determine a location of the component to be serviced for the current maintenance step of the maintenance task based upon markerless image data from the camera and three dimensional model data associated with the component to be serviced by comparing the markerless image data from the camera to the three dimensional model data associated with the component to be serviced;
   generate graphical data for the current maintenance step of the maintenance task, the graphical data including a location indicator for locating the component based upon the determined location of the component;
   output the generated graphical data to the heads-up display;
   determine automatically, after the current maintenance step of the maintenance task is indicated to be completed, whether the current maintenance step was correctly completed by comparing an image from the camera to an updated three-dimensional model of the component, the updated three-dimensional model of the component updated to reflect the state of the component after the change to the component that should have been made when the maintenance step was correctly performed;
generate, when the current maintenance step was not completed correctly, further instructions to complete the current maintenance step and output the further instructions to the heads-up display; and
proceed to a next maintenance step when the current maintenance step was completed correctly.

* * * * *

UNITED STATES PATENT AND TRADEMARK OFFICE
CERTIFICATE OF CORRECTION

PATENT NO. : 9,740,935 B2  
APPLICATION NO. : 14/090095  
DATED : August 22, 2017  
INVENTOR(S) : Dusik et al.

Page 1 of 1

It is certified that error appears in the above-identified patent and that said Letters Patent is hereby corrected as shown below:

On the Title Page

(72) Inventors: Matej Dusik, Brno (CZ);
Dinkar Mylaraswamy, Fridley, MN (US);
Jiri Vasek, Brno (CZ);
Jindrich Finda, Brno (CZ);
Michal Kosik, Dolny Kubin "(SL)" should be changed to --(SK)--.

Signed and Sealed this
Third Day of October, 2017

Joseph Matal
*Performing the Functions and Duties of the*
*Under Secretary of Commerce for Intellectual Property and*
*Director of the United States Patent and Trademark Office*